United States Patent
Inoue et al.

(10) Patent No.: US 9,964,216 B2
(45) Date of Patent: *May 8, 2018

(54) SLIDING COMPONENT

(71) Applicant: EAGLE INDUSTRY CO., LTD., Minato-ku, Tokyo (JP)

(72) Inventors: Hideyuki Inoue, Tokyo (JP); Takeshi Hosoe, Tokyo (JP); Yuta Negishi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/385,913

(22) PCT Filed: May 15, 2013

(86) PCT No.: PCT/JP2013/063498
§ 371 (c)(1),
(2) Date: Sep. 17, 2014

(87) PCT Pub. No.: WO2013/176009
PCT Pub. Date: Nov. 28, 2013

(65) Prior Publication Data
US 2015/0097341 A1    Apr. 9, 2015

(30) Foreign Application Priority Data

May 21, 2012 (JP) .................................. 2012-116033

(51) Int. Cl.
*F16J 15/34*    (2006.01)

(52) U.S. Cl.
CPC ................................. *F16J 15/3424* (2013.01)

(58) Field of Classification Search
CPC ...... F16J 15/441; F16J 15/3412; F16J 15/342; F16J 15/3244; F16J 15/3484; F16J 15/3424

(Continued)

(56) References Cited

U.S. PATENT DOCUMENTS 3,640,541 A * 2/1972 Taschenberg .................. 277/400
3,804,424 A * 4/1974 Gardner ............... F16J 15/3412
277/360

(Continued)

FOREIGN PATENT DOCUMENTS

JP    H07-260009 A    10/1995
JP    2009-014183 A    1/2009

(Continued)

OTHER PUBLICATIONS

Notification of Transmittal of Translation of the International Preliminary Report on Patentability (PCT/IB/338) dated Dec. 4, 2014, with International Preliminary Report on Patentability (PCT/IB/373) and Written Opinion of the International Searching Authority (PCT/ISA/237), for corresponding international application PCT/JP2013/063498.

(Continued)

*Primary Examiner* — Nathan Cumar
(74) *Attorney, Agent, or Firm* — Hayes Soloway P.C.

(57) ABSTRACT

A sliding component is characterized in that, on one sealing face of a pair of sliding parts that slide relative to each other, multiple positive pressure-generating mechanisms that include extremely shallow parallel grooves running roughly in parallel with the sealing face and having a submicron-level height difference are provided independently in the circumferential direction, and that the extremely shallow parallel grooves connect to the high-pressure fluid side, but are isolated from the low-pressure fluid side by a seal area. The sliding component can reduce a leakage rate of sealed fluid and significantly improve lubrication characteristics at startup or stop, while being actuated by means of fluid lubrication in a rotation phase, thereby achieving the effects of sealing and lubrication at the same time.

15 Claims, 6 Drawing Sheets

(58) Field of Classification Search
USPC .......................................................... 277/399
See application file for complete search history.

(56) References Cited

U.S. PATENT DOCUMENTS

| | | | | |
|---|---|---|---|---|
| 3,822,066 | A * | 7/1974 | Keys | .............................. 277/405 |
| 4,212,475 | A * | 7/1980 | Sedy | .................... F16J 15/3412 |
| | | | | 277/400 |
| 5,447,316 | A * | 9/1995 | Matsui | ................. F16J 15/3412 |
| | | | | 277/400 |
| 5,529,317 | A * | 6/1996 | Muller | ................. F16J 15/3404 |
| | | | | 277/400 |
| 5,529,318 | A | 6/1996 | Fuse et al. | |
| 5,664,787 | A | 9/1997 | Fuse et al. | |
| 7,194,803 | B2 * | 3/2007 | Young et al. | ................ 29/888.3 |
| 7,744,094 | B2 * | 6/2010 | Yanagisawa | ........... F16J 15/342 |
| | | | | 277/399 |
| 2001/0035593 | A1 * | 11/2001 | Peiffer et al. | .............. 264/176.1 |
| 2003/0209859 | A1 | 11/2003 | Young et al. | |
| 2005/0062233 | A1 * | 3/2005 | Iketani | .......................... 277/549 |
| 2011/0101616 | A1 * | 5/2011 | Teshima et al. | ............. 277/358 |
| 2012/0217705 | A1 * | 8/2012 | Hosoe et al. | ................. 277/400 |

FOREIGN PATENT DOCUMENTS

| | | |
|---|---|---|
| JP | 2011-196429 A | 10/2011 |
| WO | 2009/087995 A1 | 7/2009 |
| WO | 2011/115073 A | 9/2011 |

OTHER PUBLICATIONS

International Search Report dated Jul. 2, 2013, issued for International Application No. PCT/JP2013/063498.
An Office Action issued by the State Intellectual Property Office of China, dated Jul. 21, 2015, with a search report for Chinese counterpart application No. 201380013947.X.

* cited by examiner

SLIDING COMPONENT

This application is the U.S. National Phase under 35 U.S.C. § 371 of International Application PCT/JP2013/063498, filed May 15, 2013, which claims priority to Japanese Patent Application No. 2012-116033, filed May 21, 2012. The International Application was published under PCT Article 21(2) in a language other than English.

TECHNICAL FIELD

The present invention relates to a sliding component suitable for mechanical seals, bearings, and other sliding mechanisms. In particular, the present invention relates to a sliding component for seal rings, bearings, and other mechanisms where fluid is present on the sealing face to reduce friction and where leakage of fluid from the sealing face must be prevented.

BACKGROUND ART

With a mechanical seal, which is an example of a sliding component, the mutually exclusive conditions of "seal" and "lubricate" must be satisfied simultaneously in order to maintain its sealing performance for an extended time. Particularly in recent years, to help protect the environment, etc., there is a growing need to lower friction further and thereby reduce mechanical loss, while still preventing leakage of the fluid being sealed. Friction can be lowered by creating a so-called fluid lubrication state, which represents a state of surfaces sliding against each other with a liquid film in between, achieved by generating dynamic pressure between the sealing faces by means of rotation. In this case, however, generation of positive pressure between the sealing faces causes the fluid to flow out of the sealing faces from the positive pressure area. This is so-called side leakage that occurs with a bearing, which corresponds to leakage in the case of a seal. When the fluid to be sealed is present on the outer periphery side of the seal area and atmosphere on the inner periphery side, and the fluid on the outer periphery side is sealed in this state (referred to as the "inside type"), the leakage rate on the inner periphery side is expressed by the formula below:

$$Q = -\int \left( \frac{h^3}{12\eta} \frac{\partial p}{\partial r} \bigg|_{r=r_1} \right) r_1 \cdot d\theta \quad \text{\{Mathematical Formula 1\}}$$

Q: Leakage rate on the inner periphery side at the inner diameter r1 of the sealing face (The negative sign indicates leakage.)
h: Height of clearance
$\eta$: Viscosity of fluid
p: Pressure From the above formula, it is clear that the pressure slope $\partial p/\partial r$ at the inner periphery side increases as fluid lubrication is promoted, dynamic pressure generates, and liquid film forms, and as a result of a larger h, the leakage rate Q increases.

In the case of a seal, therefore, the clearance h and pressure slope $\partial p/\partial r$ must be decreased in order to reduce the leakage rate Q.

Figure 5:
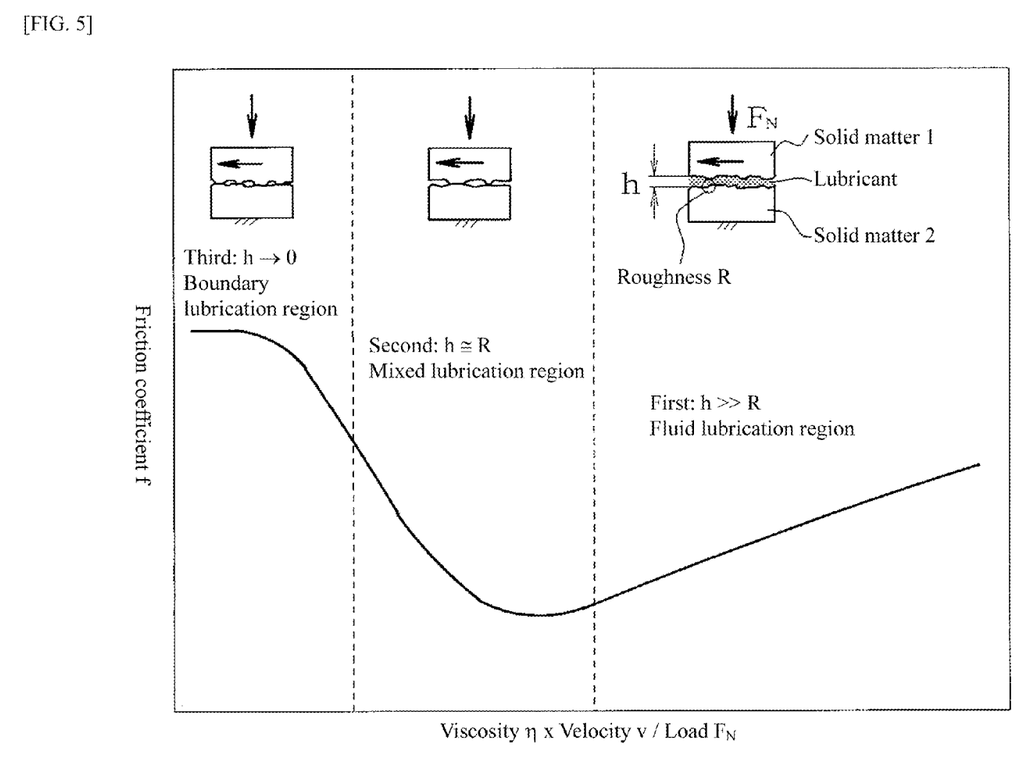
FIG. 5 Drawing showing the friction characteristics of a bearing, where the horizontal axis represents the bearing characteristic number G (non-dimensional), while the vertical axis represents the friction coefficient f.

As for the friction characteristics of a slide bearing, which are similar to those of a mechanical seal, the "Stribeck curve" shown in FIG. 5 is known (Reference Literature: "Tribology" by H. Czichos, Kodansha).

The horizontal axis in FIG. 5 represents "Viscosity $\eta \times$Velocity v/Load $F_N$," or simply the velocity if the viscosity and load are constant. If the viscosity and load are constant, the friction coefficient is small in the medium-speed region or mixed lubrication region "Second: h (clearance)≅R (roughness)" and the high-speed region or fluid lubrication region "First: h (clearance)>>R (roughness)," but the friction coefficient becomes extremely large at startup in the boundary lubrication region "Third: h (clearance)→0."

Figure 6:
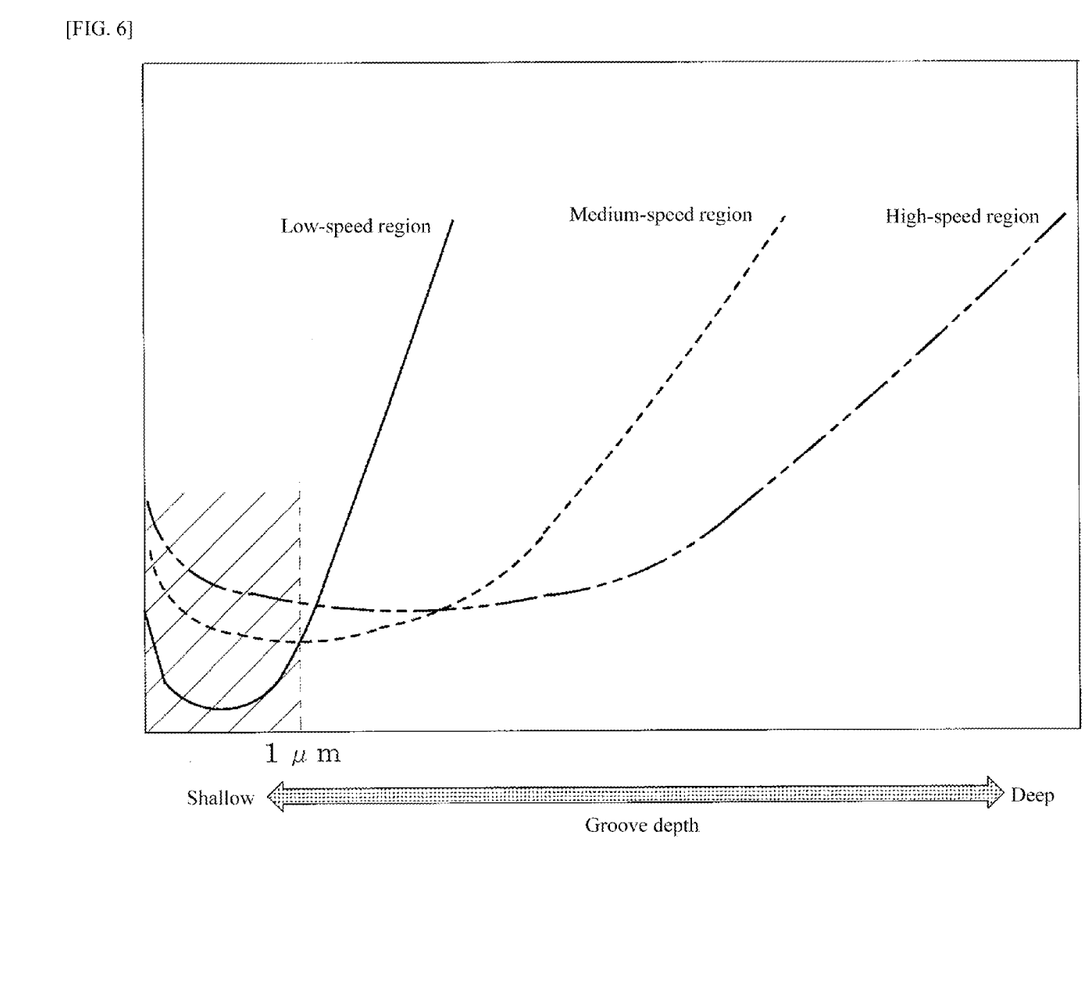
FIG. 6 Relationship between the depth of grooves on the sealing face of a mechanical seal on one hand, and friction coefficient of the sealing face on the other, obtained at each sliding speed of the sealing face.

According to the numerical analysis conducted by the inventors named in the present application for patent, on the other hand, the groove depth on the sealing face and friction coefficient of the sealing face have the relationship shown in FIG. 6 in the case of a mechanical seal, and the relationship between the groove depth and friction coefficient of the sealing face varies depending on the sliding speed of the sealing face.

Also, generally dynamic pressure-generating grooves are provided on a mechanical seal to ensure the mechanical seal is effective in the normal rotational speed region and also to guide sufficient fluid to the sealing face, and these dynamic pressure-generating grooves are processed to a depth of several μm or more by means of machining, blasting, or laser. Because of this, low friction is achieved in the medium-speed region and high-speed region, but sufficient load capacity cannot be achieved in the low-speed region, which makes it difficult to achieve low friction in this speed region. Particularly at startup and stop where sufficient dynamic pressure does not generate, sufficient lubrication characteristics are not demonstrated and problems occur as a result, such as noise and excessive contact between the sealing faces at startup and stop.

Also in recent years, sliding materials for mechanical seals are proposed that can reduce the friction coefficient without generating excessive leakage by introducing the sealed fluid to the space between the sealing faces and holding it there in good condition, including one where multiple dynamic pressure-generating grooves are provided in the circumferential direction to generate dynamic pressure between the sealing faces as a result of one sealing face rotating relative to the mating sealing face, wherein the dynamic pressure-generating grooves comprise straight grooves or curved spiral grooves having an angle to the sliding direction and the dynamic pressure-generating grooves are processed to a depth of 1 μm or less by means of femtosecond laser (refer to Patent Literatures 1 and 2, for example).

However, the inventions described in Patent Literatures 1 and 2 aim to generate dynamic pressure between the sealing faces as a result of one sealing face rotating relative to the mating sealing face, and although low friction is achieved in the medium- and high-speed regions at high pressure, sufficient dynamic pressure is not generated and thus sufficient lubrication characteristics cannot be demonstrated in the medium- and high-speed regions at low pressure or at startup and stop, which presents a problem. In addition, the mechanism of introducing the sealed fluid into the space between the sealing faces by the dynamic pressure-generating grooves requires circular grooves or other means for preventing leakage to be provided on the low-pressure side of the sealing face, in order to reduce the leakage rate.

PRIOR ART LITERATURES

Patent Literatures

Patent Literature 1: International Patent Laid-open No. 2009/087995

Patent Literature 2: Japanese Patent Laid-open No. 2011-196429

SUMMARY OF INVENTION

Problems to be Solved by Invention

An object of the present invention is to provide a sliding component that reduces the leakage rate of sealed fluid and significantly improves the lubrication characteristics at startup or stop, while being actuated by means of fluid lubrication in the rotation phase, thereby achieving the effects of sealing and lubrication at the same time.

Means to Solve Problems

To achieve the aforementioned object, firstly the sliding component proposed by the present invention are characterized in that: on one sealing face of a pair of sliding parts that slide relative to each other, multiple positive pressure-generating mechanisms that comprise extremely shallow parallel grooves running roughly in parallel with the sealing face and having submicron-level height differences are provided independently in the circumferential direction; the extremely shallow parallel grooves connect to the high-pressure fluid side, but are isolated from the low-pressure fluid side by a seal area.

According to the first feature, the sealed fluid entering the extremely shallow parallel grooves forms an extremely thin fluid film and the action of its surface tension increases the pressure region where the fluid can be sealed without increasing leakage, while in the rotation phase the relative sliding of the applicable sealing face with the mating sealing face generates dynamic pressure so that the sealing face can be lifted by the minimum required amount as a result of the dynamic pressure effect, and consequently good lubrication performance can be maintained without increasing leakage and, in particular, the lubrication characteristics at startup or stop can be improved significantly.

Secondly, the sliding component proposed by the present invention is characterized in that the extremely shallow parallel grooves have a depth h of 10 nm to 1 μm and roughness α of 1 to 100 nm at the bottom of the groove, and satisfy the relationship of h>α.

Thirdly, the sliding component proposed by the present invention is characterized in that preferably the extremely shallow parallel grooves have a depth h of 50 to 500 nm and roughness α of 1 to 30 nm at the bottom of the groove, and satisfy the relationship of h>α.

According to the second and third features, the lubrication characteristics at startup or stop can be further improved significantly without increasing leakage.

In addition to any one of the first through third features, fourthly, the sliding component proposed by the present invention is characterized in that the extremely shallow parallel grooves are formed by multiple grooves of different depths.

According to the fourth feature, different positive pressures can be generated according to the rotating direction of the mating sealing face by, for example, forming multiple grooves of different depths in a manner adjoining each other in the circumferential direction. In addition, by forming multiple grooves of different depths in a manner adjoining each other in the diameter direction, for example, the lubricant retention function can be improved if shallow grooves are provided on the outer diameter side of the sealing face and deep grooves on the inner diameter side.

In addition to any one of the first through fourth features, fifthly, the sliding component proposed by the present invention is characterized in that preferably the extremely shallow parallel grooves are provided to account for 5 to 70% of the area of the sealing face.

According to the fifth feature, the surface pressure of the sealing face can be maintained in good condition, while leakage can be reduced and the lubrication characteristics at startup or stop improved significantly.

In addition to any of the first through fifth features, sixthly, the sliding component proposed by the present invention is characterized in that the pair of sliding parts is comprised of ring-shaped bodies each used as either a stationary-side sliding member or rotating-side sliding member of a mechanical seal that rotates relative to the other member.

According to the sixth feature, a mechanical seal achieving significantly improved lubrication characteristics at startup or stop without increasing leakage can be obtained.

Effects of Invention

The present invention has the excellent effects listed below:

(1) On one sealing face of a pair of sliding parts that slide relative to each other, multiple positive pressure-generating mechanisms that comprise extremely shallow parallel grooves running roughly in parallel with the sealing face and having a submicron-level height differences are provided independently in the circumferential direction, and the extremely shallow parallel grooves connect to the high-pressure fluid side, but are isolated from the low-pressure fluid side by a seal area, and therefore the sealed fluid entering the extremely shallow parallel grooves forms an extremely thin fluid film and the action of its surface tension increases the pressure region where the fluid can be sealed without increasing leakage, while in the rotation phase the relative sliding of the applicable sealing face with the mating sealing face generates dynamic pressure so that the sealing face can be lifted by the minimum required amount as a result of the dynamic pressure effect, and consequently good lubrication performance can be maintained without increasing leakage and particularly the lubrication characteristics at startup or stop can be improved significantly.

(2) The extremely shallow parallel grooves are formed by multiple grooves of different depths, and therefore different positive pressures can be generated according to the rotating direction of the mating sealing face if, for example, multiple grooves of different depths are formed in a manner adjoining each other in the circumferential direction. Additionally, by forming multiple grooves of different depths in a manner adjoining each other in the diameter direction, for example, the lubricant retention function can be improved if shallow grooves are provided on the outer diameter side of the sealing face and deep grooves on the inner diameter side.

(3) Preferably the extremely shallow parallel grooves are provided to account for 5 to 70% of the area of the sealing face, and accordingly the surface pressure of the sealing face can be kept in good condition, while at the same time leakage can be reduced and the lubrication characteristics at startup or stop can be improved significantly.

(4) The pair of sliding parts is comprised of ring-shaped bodies each used as either a stationary-side sliding member or rotating-side sliding member of a mechanical seal that rotates relative to the other member, and accordingly a mechanical seal achieving significantly improved lubrication characteristics at startup or stop without increasing leakage can be obtained.

MODES FOR CARRYING OUT THE INVENTION

Modes for carrying out a sliding component pertaining to the present invention are explained in detail by referring to the drawings, but it should be noted that the present invention should not be interpreted in a limited way according to these embodiments alone, and various modifications, corrections and improvements may be added based on the knowledge of those skilled in the art so long as they do not deviate from the scope of the present invention.

Embodiment 1

Figure 1:
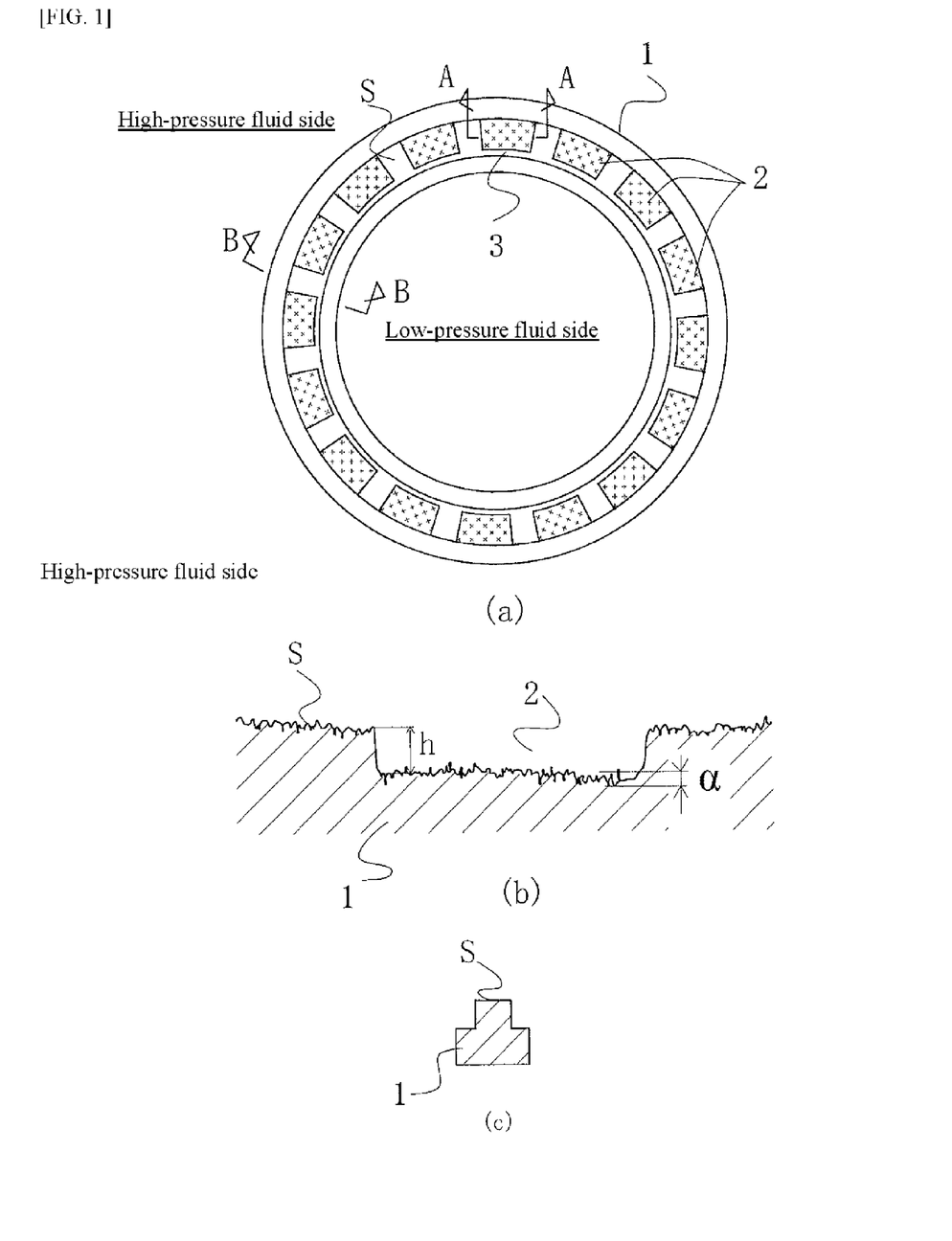
FIG. 1 Drawings showing the sealing face of a sliding component pertaining to Embodiment 1 of the present invention, where (a) is a plan view of the sealing face, (b) is a section view taken along A-A, (c) is a section view taken along B-B.

The sliding component pertaining to Embodiment 1 of the present invention is explained by referring to FIG. 1.

As shown in FIG. 1 (a), a sliding component 1 constitutes a ring-shaped body and normally high-pressure sealed fluid is present on one side of the inner/outer peripheries of the sealing face S of the sliding component 1, while atmosphere is on the other side.

This sealed fluid can be effectively be sealed using the sliding component 1. For example, this sliding component 1 is used as one of the pairs of seal ring for rotation and seal ring for fixing in mechanical seal devices. The sealing face of the seal ring for rotation is contacted with the sealing face of the seal ring for fixing facing the seal ring for rotation, to seal the sealed fluid present on either the inner periphery or outer periphery of the sealing face. The sliding component can also be used as a bearing that slides against its rotating axis while sealing lubricating oil on one side of the cylindrical sealing face in the axial direction.

In FIG. 1, a case where high-pressure sealed fluid is present on the outer periphery side is explained for the sake of convenience.

In the illustrated example, the cross section of the sliding component 1 has a convex shape as shown in FIG. 1 (c) and its top face constitutes a sealing face S. This sealing face S has multiple positive pressure-generating mechanisms provided on it independently in the circumferential direction, which are running roughly in parallel with the sealing face S and constituted by extremely shallow parallel grooves 2 having submicron-level height differences, as shown in FIG. 1 (b).

The extremely shallow parallel grooves 2 are provided not over the entire width of the sealing face S in the diameter direction, but only in an area closer to the high-pressure fluid side, and connect to the high-pressure fluid side, while being isolated from the low-pressure fluid side by a seal area 3.

The extremely shallow parallel grooves 2 are set in such a way that their depth h is in a range of 10 nm to 1 μm and roughness α at the bottom of the groove is in a range of 1 to 100 nm, and the relationship of "Groove depth h>Roughness α at the bottom of the groove" is satisfied.

In addition, preferably the extremely shallow parallel grooves 2 are set in such a way that their depth h is in a range of 50 to 500 nm and roughness α at the bottom of the groove is in a range of 1 to 30 nm, and the relationship of "Groove depth h>Roughness α at the bottom of the groove" is satisfied.

Now, the "positive pressure-generating mechanisms constituted by extremely shallow parallel grooves" under the present invention are explained.

Since the extremely shallow parallel grooves 2 constituting the positive pressure-generating mechanisms are extremely shallow, represented by their depth h in a range of 10 nm to 1 μm, for example, while their roughness α at the bottom of the groove is in a range of 1 to 100 nm and the relationship of "Groove depth h>Roughness α at the bottom of the groove" is also satisfied, the sealed fluid entering the extremely shallow parallel grooves 2 forms an extremely thin fluid film and the action of its surface tension increases the pressure region where the fluid can be sealed without increasing leakage. In the rotation phase, dynamic pressure generates as a result of the applicable sealing face sliding relative to the mating sealing face and the sealing face is lifted by the dynamic pressure effect. By providing the positive pressure-generating mechanisms constituted by the extremely shallow parallel grooves 2, the lubrication characteristics at startup or stop can be improved significantly without increasing leakage.

Figure 2:
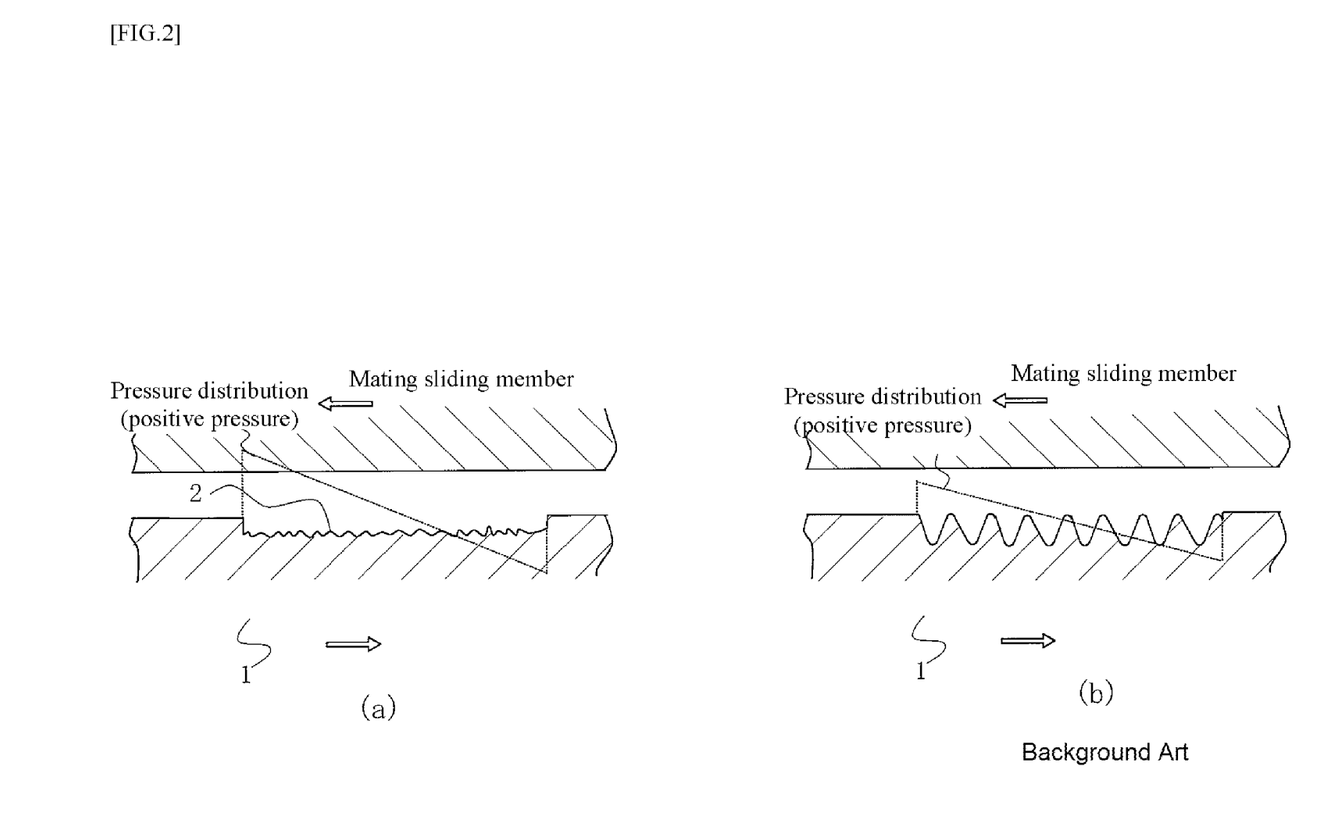
FIG. 2 Drawings explaining the dynamic pressure effect, where (a) represents the present invention, while (b) represents prior art.

How dynamic pressure generates as a result of the applicable sealing face sliding relative to the mating sealing face and the sealing face is lifted by the dynamic pressure effect during the rotation phase is explained in detail by referring to FIG. 2.

As shown in FIG. 2 (a), under the present invention the extremely shallow parallel grooves 2 are extremely shallow and satisfy the relationship of "Groove depth h>Roughness α at the bottom of the groove" and therefore the dynamic pressure generating as a result of the applicable sealing face sliding relative to the mating sealing face has a large pressure distribution.

In the case of prior art, on the other hand, the dynamic pressure-generating grooves are formed in such a way that the height is roughly the same as the depth of the grooves, as shown in FIG. 2 (b), and therefore the dynamic pressure generating as a result of the applicable sealing face sliding relative to the mating sealing face has a smaller pressure distribution compared to that under the present invention because of a lower fluid introduction efficiency.

Under the present invention, the extreme shallowness of the grooves reduces leakage at startup or stop, while in the rotation phase the high fluid introduction efficiency leads to high lubrication effect despite the extreme shallowness of the grooves.

Also, preferably the extremely shallow parallel grooves 2 are provided to account for 5 to 70% of the area of the sealing face S. While the extremely shallow parallel grooves 2 are equally distributed at 16 locations in the circumferential direction in the illustrated example, their distribution is not at all limited to the foregoing and it suffices that they are equally distributed at four locations at a minimum, for example.

The sealing face S itself is set, by mirror-surface finishing, to a level of roughness at which the extremely shallow parallel grooves 2 become clearly recognized.

These extremely shallow parallel grooves are processed by means of etching, for example. However, the method is not at all limited to etching and any other processing method may be used so long as grooves can be processed to a depth h in a range of 10 nm to 1 µm and roughness α at the bottom of the groove in a range of 1 to 100 nm, where the relationship of "Groove depth h>Roughness α at the bottom of the groove" is satisfied.

Figure 3:
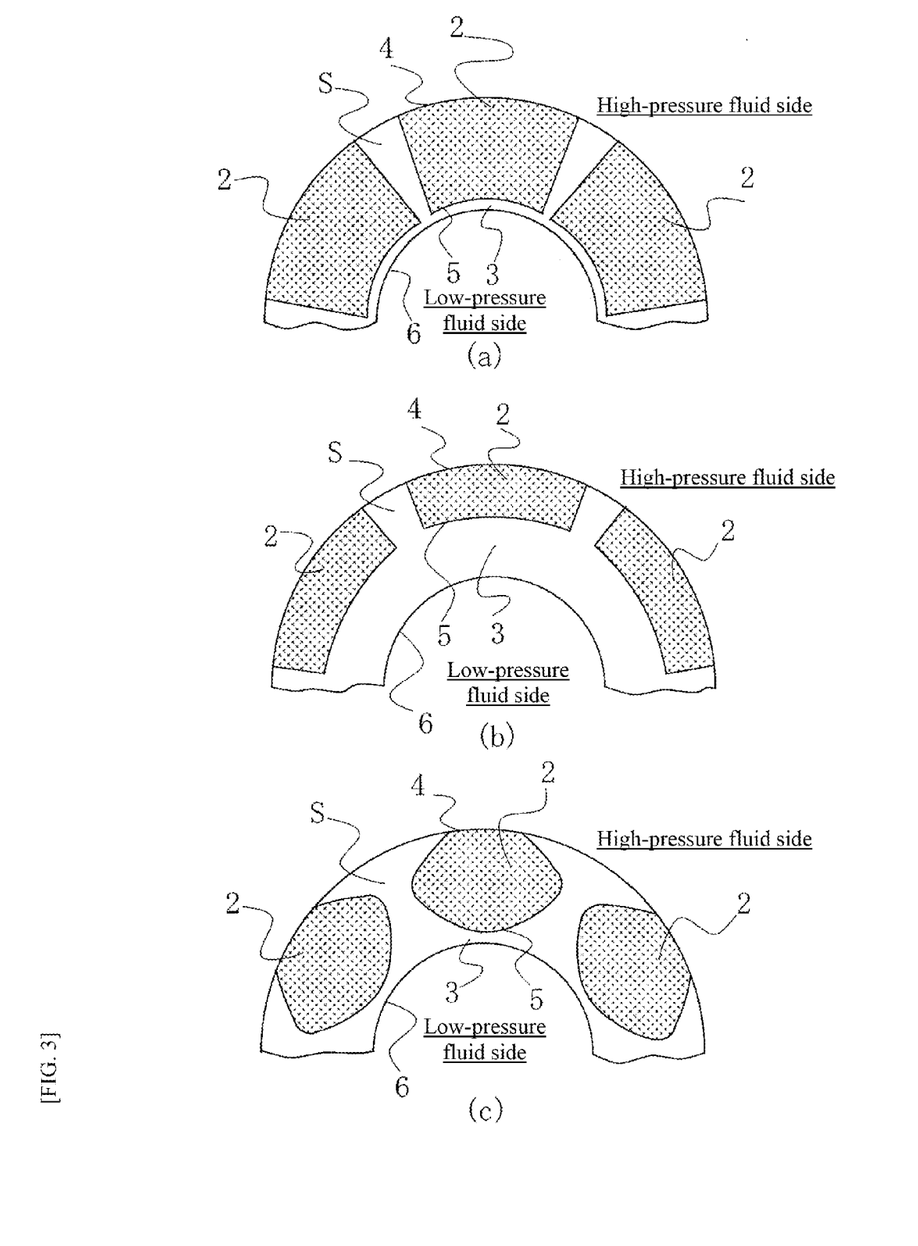
FIG. 3 Drawings showing the planar shapes of extremely shallow parallel grooves formed on the sealing face, where (a) shows that the space between the inner periphery of the extremely shallow parallel grooves and inner periphery of the sealing face is narrow, (b) shows that the space between the inner periphery of the extremely shallow parallel grooves and inner periphery of the sealing face is wide, and (c) provides an example of planar shape variation of extremely shallow parallel grooves.

Next, the shapes of the extremely shallow parallel grooves 2 provided on the sealing face S are explained by referring to FIG. 3.

FIG. 3 (*a*) shows that the extremely shallow parallel grooves 2 have roughly a fan shape, their outer periphery 4 connects to the high-pressure fluid side, and the space between the inner periphery 5 of the extremely shallow parallel grooves 2 and inner periphery 6 of the sealing face S is narrow. According to this shape, lubrication characteristics are good but leakage occurs relatively easily.

FIG. 3 (*b*) shows that the extremely shallow parallel grooves 2 have a roughly fan shape, their outer periphery 4 connects to the high-pressure fluid side, and the space between the inner periphery 5 of the extremely shallow parallel grooves 2 and inner periphery 6 of the sealing face S is wide. According to this shape, leakage does not occur easily, but lubrication characteristics are relatively poor.

FIG. 3 (*c*) shows an example of planar shape variation of extremely shallow parallel grooves 2.

While the extremely shallow parallel grooves 2 in FIGS. 3 (*a*) and (*b*) have roughly a fan shape, the extremely shallow parallel grooves 2 in FIG. 3 (*c*) have roughly an oval shape, their outer periphery 4 connected to the high-pressure fluid side is narrow and the shape gradually widens toward the inner periphery side, while the inner periphery 5 forms an arc-shaped convex toward the low-pressure fluid side and the space between the sealing face S and inner periphery 6 is narrow near the arc-shaped apex and wide on both sides of the arc-shaped apex. According to this shape, the sealed fluid does not enter easily into the extremely shallow parallel grooves 2 from the high-pressure fluid side, but once entered in the grooves the sealed liquid is trapped therein and does not leak easily to the low-pressure fluid side. This results in relatively less leakage and in particular, good lubrication characteristics at stop.

Embodiment 2

Figure 4:
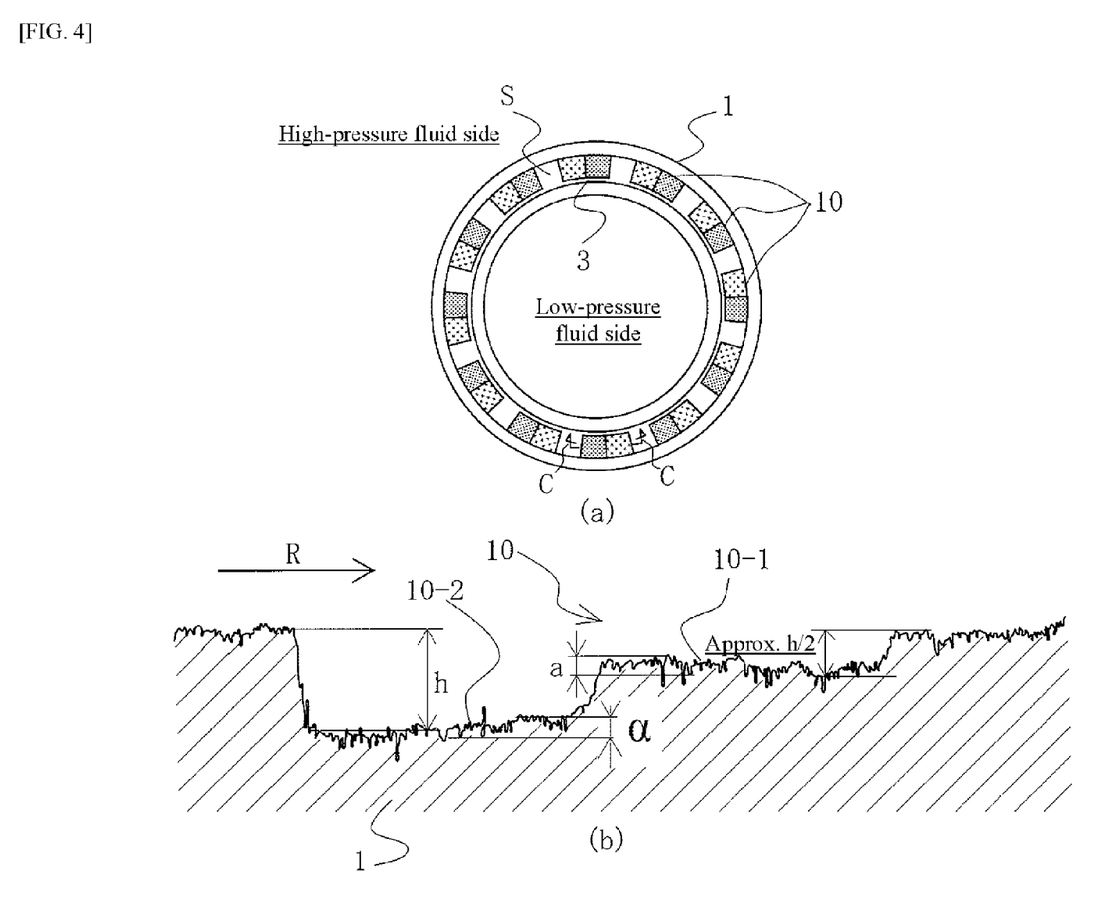
FIG. 4 Drawings showing the sealing face of a sliding component pertaining to Embodiment 2 of the present invention, where (a) is a plan view of the sealing face, while (b) is a section view taken along C-C.

The sliding component pertaining to Embodiment 2 of the present invention is explained by referring to FIG. 4.

It should be noted that, in FIG. 4, the same symbols as those used in Embodiment 1 indicate the same members referenced in Embodiment 1 and are therefore not explained in detail.

On the sealing face S, multiple positive pressure-generating mechanisms that comprise extremely shallow parallel grooves 10 running roughly in parallel with the sealing face S and having a submicron-level height difference are provided independently in the circumferential direction, as shown in FIG. 4 (*b*). The extremely shallow parallel grooves 10 are such that extremely shallow parallel grooves (shallow grooves) 10-1 having a first height difference and extremely shallow parallel grooves (deep grooves) 10-2 having a second height difference are formed adjacent to each other in the circumferential direction. The extremely shallow parallel grooves (deep grooves) 10-2 having the second height difference have a depth h in a range of 10 nm to 1 µm and roughness α at the bottom of the groove in a range of 1 to 100 nm, where the relationship of "Groove depth h>Roughness α at the bottom of the groove" is satisfied. Also, the depth of the extremely shallow parallel grooves (shallow grooves) 10-1 having the first height difference is set to around one half the depth of the extremely shallow parallel grooves (deep grooves) 10-2 having the second height difference. These extremely shallow parallel grooves (shallow grooves) 10-1 having the first height difference satisfy the relationship of "Groove depth approx. h/2>Roughness α at the bottom of the groove."

If the extremely shallow parallel grooves have two height differences as shown in FIG. 4 (*b*), different positive pressures are generated according to the rotating direction of the mating sealing face. In other words, greater positive pressure generates when the rotating direction of the mating sealing face corresponds to the direction indicated by the arrow R.

In FIG. 4, the extremely shallow parallel grooves 10 are such that extremely shallow parallel grooves (shallow grooves) 10-1 having the first height difference and extremely shallow parallel grooves (deep grooves) 10-2 having the second height difference are formed adjacent to each other in the circumferential direction, but it is also possible to place the extremely shallow parallel grooves (deep grooves) 10-2 having the second height difference on the inner diameter side and extremely shallow parallel grooves (shallow grooves) 10-1 having the first height difference on the outer diameter side, so that both are positioned adjacent to each other. By doing so, the lubricant retention function of the seal area 3 can be improved. Accordingly, this placement is suitable for the planar-shaped extremely shallow parallel grooves shown in FIG. 3 (*a*).

The operations and effects of the sliding component pertaining to either embodiment of the present invention are as follows:

Since the extremely shallow parallel grooves 2 constituting the positive pressure-generating mechanisms are extremely shallow, represented by their depth h in a range of 10 nm to 1 µm, for example, while their surface roughness α at the bottom of the groove is in a range of 1 to 100 nm and the relationship of "Groove depth h>Roughness α at the bottom of the groove" is satisfied, the sealed fluid entering the extremely shallow parallel grooves 2 forms an extremely thin fluid film and the action of its surface tension increases the pressure region where the fluid can be sealed without increasing leakage. In the rotation phase, dynamic pressure generates as a result of the applicable sealing face sliding relative to the mating sealing face and the sealing face is lifted by the dynamic pressure effect. The minimum required positive pressure-generating mechanism constituted by the extremely shallow parallel grooves 2 can significantly improve the lubrication characteristics at startup or stop without increasing leakage.

Also, preferably the extremely shallow parallel grooves 2 have a depth h in a range of 50 to 500 nm and roughness α at the bottom of the groove in a range of 1 to 30 nm, and satisfy the relationship of "Groove depth h>Roughness α at the bottom of the groove," and therefore the lubrication characteristics at startup or stop can be further improved significantly without increasing leakage.

Also, the extremely shallow parallel grooves 2 are formed by multiple grooves of different depths, and therefore different positive pressures can be generated according to the rotating direction of the mating sealing face if, for example, multiple grooves of different depths are formed in a manner adjoining each other in the circumferential direction. Furthermore, by forming multiple grooves of different depths in a manner adjoining each other in the diameter direction, for example, the lubricant retention function can be improved if shallow grooves 10-1 are formed on the outer diameter side and deep grooves 10-2 on the inner diameter side, which leads to a good lubrication effect on the sealing face S.

Also, preferably the extremely shallow parallel grooves 2 are provided to account for 5 to 70% of the area of the sealing face S, and therefore the surface pressure of the sealing face S can be maintained in a good condition, while leakage can be reduced and the lubrication characteristics at startup or stop improved significantly.

Also, when the pair of sliding parts is comprised of ring-shaped bodies each used as either a stationary-side sliding member or rotating-side sliding member of a mechanical seal that rotates relative to the other member, a mechanical seal achieving significantly improved lubrication characteristics at startup or stop without increasing leakage can be obtained.

The foregoing explained embodiments of the present invention using the drawings, but it should be noted that specific constitutions of the present invention are not at all limited to these embodiments, and any modifications and additions thereto are also included in the scope of the present invention so long as they do not deviate from the key points of the present invention.

In the aforementioned embodiment, for example, an example of using the sliding component for one of the pairs of seal ring for rotation and seal ring for fixing in mechanical seal devices was explained, but the sliding component can also be used as a bearing that slides against its rotating axis while sealing lubricating oil on one side of the cylindrical sealing face in the axial direction.

Also the an aforementioned embodiment, a case where high-pressure sealed fluid is present on the outer periphery side was explained, for example, but the present invention can also be applied when high-pressure fluid is present on the inner periphery side, in which case the extremely shallow parallel grooves can be provided in a manner connected to the inner periphery side.

REFERENCE SIGNS

1 Sliding component
2 Extremely shallow parallel groove
3 Seal area
4 Outer periphery of extremely shallow parallel groove
5 Inner periphery of extremely shallow parallel groove
6 Inner periphery of sealing face
10 Extremely shallow parallel groove
S Sealing face

The invention claimed is:

1. A sliding component comprising a pair of sliding parts constituted by ring shaped bodies and having sealing faces relatively slidable to each other, wherein:
on one of the sealing faces of the pair of sliding parts, a positive pressure-generating mechanism that comprises multiples of extremely shallow parallel grooves having bottoms with a submicron-level depth, the bottom of the grooves running roughly in parallel with the sealing face, said multiples of extremely shallow parallel grooves being aligned in a circumferential direction in such a way to be separated from and not connected to each other by a seal area, wherein
each extremely shallow parallel groove is a recess that is recessed from the seal area and that is defined by:
a bottom surface having a roughly oval shape,
two straight side walls facing each other in the circumferential direction in such a way to widen a distance therebetween toward a low pressure fluid side and slightly curved toward each other at the low pressure fluid side, and
one low-pressure fluid curved side wall smoothly connecting the two curved side walls,
wherein the recess opens at one peripheral surface of the sliding part on a high-pressure fluid side and directly communicates with the high pressure fluid side, said bottom surface having an arc-shaped apex protruded toward the low-pressure fluid side, and
wherein the extremely shallow parallel grooves are isolated from the low-pressure fluid side by the seal area.

2. A sliding component according to claim 1, wherein the extremely shallow parallel grooves have a depth h of 10 nm to 1 μm and roughness α of 1 to 100 nm at a bottom of the groove, and satisfy a relationship of h>α.

3. A sliding component according to claim 2, wherein preferably the extremely shallow parallel grooves have a depth h of 50 to 500 nm and roughness α of 1 to 30 nm at a bottom of the groove, where a relationship of h>α is satisfied.

4. A sliding component according to claim 1, wherein the extremely shallow parallel grooves are formed by multiple grooves of different depths.

5. A sliding component according to claim 1, wherein preferably the extremely shallow parallel grooves are provided to account for 5 to 70% of an area of the sealing face.

6. A sliding component according to claim 1, wherein the pair of sliding parts is comprised of ring-shaped bodies each used as either a stationary-side sliding member or rotating-side sliding member of a mechanical seal that rotates relative to the other member.

7. A sliding component according to claim 2, wherein the extremely shallow parallel grooves are formed by multiple grooves of different depths.

8. A sliding component according to claim 2, wherein the extremely shallow parallel grooves account for 5 to 70% of an area of the sealing face.

9. A sliding component according to claim 2, wherein the pair of sliding parts is comprised of ring-shaped bodies each used as either a stationary-side sliding member or a rotating-side sliding member of a mechanical seal that rotates relative to the other member.

10. A sliding component according to claim 3, wherein the extremely shallow parallel grooves are formed by multiple grooves of different depths.

11. A sliding component according to claim 3, wherein characterized in that preferably the extremely shallow parallel grooves account for 5 to 70% of an area of the sealing face.

12. A sliding component according to claim 3, wherein the pair of sliding parts is comprised of ring-shaped bodies each used as either a stationary-side sliding member or a rotating-side sliding member of a mechanical seal that rotates relative to the other member.

13. A sliding component according to claim 4, wherein the extremely shallow parallel grooves account for 5 to 70% of an area of the sealing face.

14. A sliding component according to claim 4, wherein the pair of sliding parts is comprised of ring-shaped bodies each used as either a stationary-side sliding member or a rotating-side sliding member of a mechanical seal that rotates relative to the other member.

15. A sliding component according to claim 5, wherein the pair of sliding parts is comprised of ring-shaped bodies each used as either a stationary-side sliding member or a rotating-side sliding member of a mechanical seal that rotates relative to the other member.

\* \* \* \* \*

UNITED STATES PATENT AND TRADEMARK OFFICE
CERTIFICATE OF CORRECTION

PATENT NO. : 9,964,216 B2  
APPLICATION NO. : 14/385913  
DATED : May 8, 2018  
INVENTOR(S) : Inoue et al.

Page 1 of 1

It is certified that error appears in the above-identified patent and that said Letters Patent is hereby corrected as shown below:

In the Claims

Claim 11, Column 11, Line 2, delete the words "characterized in that preferably".

Signed and Sealed this  
Fourteenth Day of August, 2018

Andrei Iancu  
*Director of the United States Patent and Trademark Office*